United States Patent
Bergmann (10) Patent No.: US 6,175,670 B1
(45) Date of Patent: Jan. 16, 2001

(54) PLANAR LIGHTGUIDE CIRCUIT HAVING A PLANAR GRATING

(75) Inventor: Ernest Eisenhardt Bergmann, Lehigh County, PA (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/046,335

(22) Filed: Mar. 23, 1998

(51) Int. Cl.[7] .................................................. G02B 6/124
(52) U.S. Cl. .............................. 385/14; 359/130; 385/24; 385/37; 385/47
(58) Field of Search ................................ 385/15, 24, 27, 385/31, 37, 39, 43, 45, 14, 47; 359/109, 115, 124, 127, 130

(56) References Cited

U.S. PATENT DOCUMENTS

| | | | |
|---|---|---|---|
| 5,459,801 | * 10/1995 | Snitzer | 385/30 |
| 5,625,726 | * 4/1997 | Ichigi | 385/14 |
| 5,633,965 | * 5/1997 | Bricheno et al. | 385/37 |
| 5,805,751 | * 9/1998 | Kewitsch et al. | 385/43 |
| 5,825,951 | * 10/1998 | Kitamura | 385/45 |
| 5,978,530 | * 11/1999 | Russell et al. | 385/37 |
| 5,995,530 | * 11/1999 | Dütting et al. | 385/45 X |

OTHER PUBLICATIONS

K. H. Tietgen et al., "180°–turns in Integrated Optics", Optics Communications, vol. 36, No. 4, Feb. 15, 1981, pp. 281–284.

J. M. Jouanno et al., "60dB Bragg gratings in planar waveguides", Optical Fiber Communication Conference and Exhibit, Feb. 16–21, 1997, pp. 228, 229.

N. Chen et al., "1.3–$\mu$m wavelength InP laterally coupled distributed feedback ridge laser", Optical Fiber Communication Conference and Exhibit, Feb. 16–21, 1997, pp. 237, 238.

H. Venghaus et al., "Optical add/drop multiplexers for WDM communication systems", Optical Fiber Communication Conference and Exhibit, Feb. 16–21, 1997, pp.280, 281.

M. Sauer et al., "Novel compact dual–channel all–fiber Bragg grating multiplexer", Optical Fiber Communication Conference and Exhibit, Feb. 16–21, 1997, pp.283, 284.

* cited by examiner

*Primary Examiner*—John D. Lee
(74) *Attorney, Agent, or Firm*—Wilford L. Wisner (57) ABSTRACT

A planar lightguide circuit having a grating coupler to backward couple a elected wavelength from among a plurality of optical signals. A cascaded arrangement of such couplers provides multiplexing or demultiplexing. In its simplest form, a planar lightguide circuit has in close proximity on a substrate first and second planar lightguides having differing effective indices of refraction in a first region. Preferably, the lightguide having the higher effective index of refraction parallels in dose proximity in the first region the lightguide having the lower effective index of refraction, the latter propagating a plurality of multiplexed signals. Typically, this relationship of effective indices of refraction is provided by differences in widths of the lightguides rather than by differences in material composition or differences in layer thicknesses. Optionally, all inputs and outputs have appearances at a common edge of the substrate. Preferably, the lightguide having the higher effective index of refraction bends toward a second region of larger separation. In the second region, at least one of the lightguides tapers toward a nominal guide width. A first planar grating in coupling proximity to said first and second planar lightguides in the first region backward couples a first signal of a selected wavelength from one of said first and second lightguides to the other of said first and second lightguides. The coupling will work in either direction to provide either demultiplexing or multiplexing of optical signals of differing wavelengths. A multiplicity of lightguides like the second lightguide will provide dense demultiplexing or multiplexing of the differing wavelengths.

12 Claims, 6 Drawing Sheets

PLANAR LIGHTGUIDE CIRCUIT HAVING A PLANAR GRATING

BACKGROUND OF THE INVENTION

1. Field of the Invention

This invention relates to planar lightguide circuits, in particular those employed in multiplexing and demultiplexing of signals 2. Discussion of the Related Art Dense Wavelength Division Multiplexing (DWDM) is the terminology applied to the latest efforts to improve the effectiveness of optical signal multiplexing and demultiplexing. DWDM, particularly that provided on a Planar Lightguide Circuit (PLC), is very attractive for mass-production of passive components for optical fiber communication systems.

Presently, many attempts are being made to use UV laser-induced fiber gratings in sensitized optical fibers to produce wavelength-selective passive components. Nevertheless, to use such gratings, one must either use a 3 dB splitter-combiner to handle the selected and back-reflected wavelength, and thereby incur the disadvantage of a 6 dB minimum insertion loss, or use a circulator, which is complex, expensive, and bulky. It is desirable to avoid these disadvantages.

SUMMARY OF THE INVENTION

According to the invention, a planar lightguide circuit has in close proximity on a substrate first and second planar lightguides having differing effective indices of refraction in a first region. Preferably, the lightguide having the higher effective index of refraction parallels in close proximity in the first region the lightguide having the lower effective index of refraction and propagating a plurality of wavelength-multiplexed signals. A first planar grating in coupling proximity to said first and second planar lightguides in the first region backward couples a first signal of a selected wavelength from one of said first and second lightguides to the other of said first and second lightguides. The coupling will work in either direction to provide either demultiplexing or multiplexing of optical signals of differing wavelengths. A multiplicity of lightguides like the second lightguide will provide dense demultiplexing or multiplexing of the differing wavelengths. Advantageously, all signal-bearing inputs and outputs can appear at a common edge of the substrate.

Typically, the above-described relationship of different effective indices of refraction in the first region, the backward-coupling region, is provided by differences in widths of the lightguides rather than by differences in material composition or differences in layer thicknesses. Nevertheless, the differences in effective indices could be supplemented by differences in layer thickness or even by differences in composition. The effective index of refraction $n_e$ of each lightguide will be intermediate between $n_0$ and $n_c$, where $n_0$ is the effective index of refraction of the medium surrounding the lightguide and $n_c$ is the effective index of refraction of material in the interior of the lightguide. The exact value of $n_e$ will depend on the exact shape of the lightguide and upon the wavelength of light propagating in the waveguide. Fatter, e.g., wider, lightguides of a given material will tend to have the relative higher values of $n_e$. Preferably, the lightguide having the higher effective index of refraction bends away from the lightguide having the lower effective index of refraction toward a second region of larger separation such that no interaction between the lightguides occurs. In a portion of the second region, at least one of the lightguides tapers toward a nominal guide width, so that the planar lightguide circuit can interface with its surroundings, e.g., a fiber array. It is a subsidiary feature of the invention that the lightguides have like effective indices of refraction and like common widths at least in that portion of the second region where interfacing may be desired. This feature also facilitates the appearance of all signal-bearing inputs and outputs substantially uniformly at a common edge of the substrate.

BRIEF DESCRIPTION OF THE DRAWING

Further features and advantages according to both aspects of the invention will become apparent from the following detailed description, taken together with the drawings, in which.

DETAILED DESCRIPTION

Figure 1:
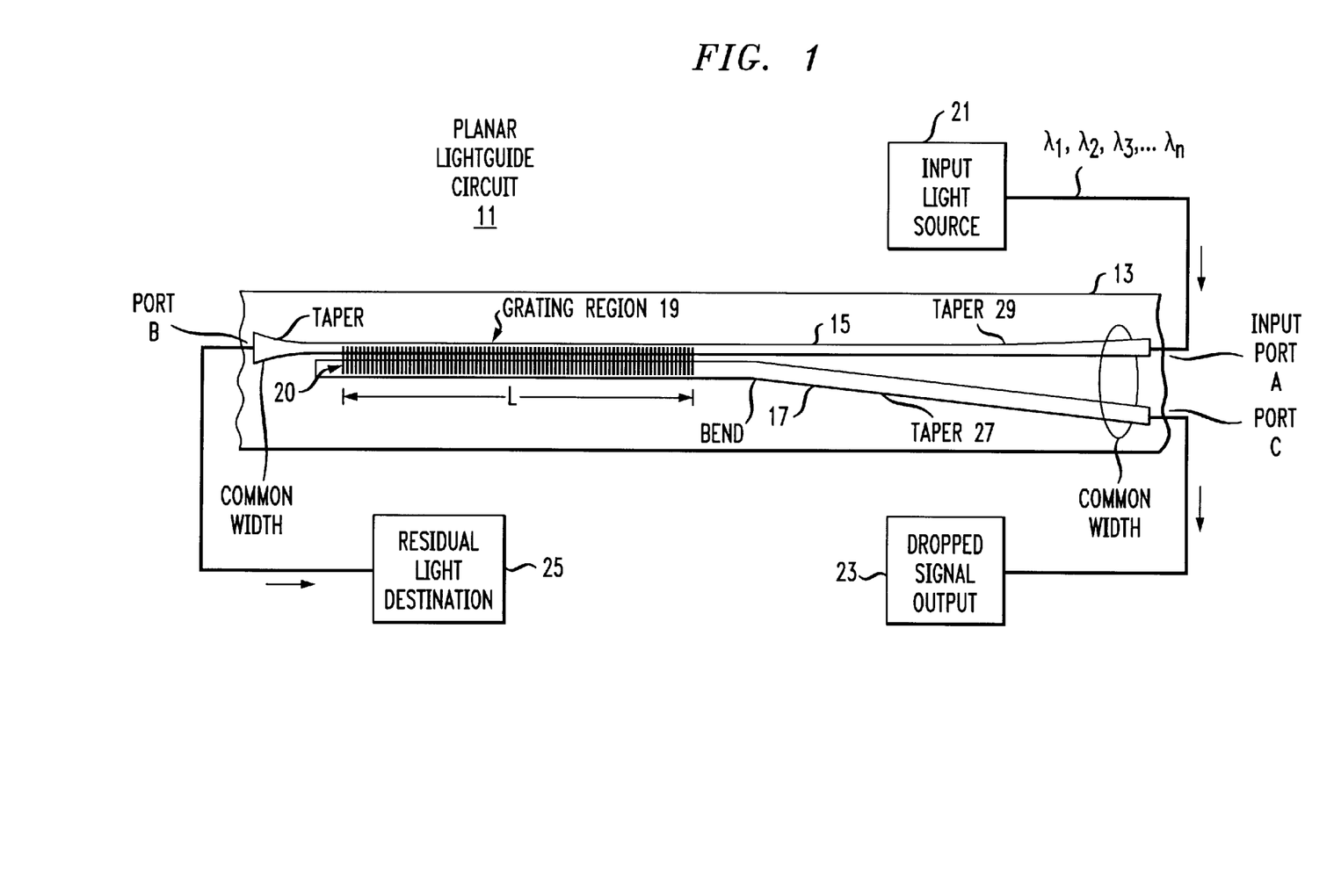
FIG. 1 shows a partially pictorial, partially block-diagrammatic view of a first embodiment of the invention.

In FIG. 1, a first embodiment of the invention is implemented in a planar lightguide circuit 11 including a substrate 13, a first planar waveguide 15 for supporting the multiplexed optical signals in either direction of propagation, and a second planar waveguide 17 that is representative of a plurality of such waveguides each propagating an individual optical signal of wavelength that can be backward-coupled between waveguide 17 and waveguide 15 by the respective grating 20. The second planar waveguide 17 parallels in close proximity the first planar waveguide 15 at a first intermediate region, the grating region 19, of planar waveguide 15. However, the second planar waveguide 17 bends so that, in a second region, it forms an acute, and relatively small, angle with respect to first planar waveguide 15. Of foremost significance for the present invention, in the grating region 19 first planar waveguide 15 has an effective index of refraction $n_1$ and second planar waveguide 17 has an effective index of refraction $n_2$ that is greater than $n_1$.

For purposes of the present invention, the waveguided signals are all optical signals having wavelength separations appropriate to Dense Wavelength Division Multiplexing. Hereinafter, the planar waveguides 15 and 17, and other similar guides, will be referred to as lightguides.

A wavelength band reflective grating 20, hereinafter referred to as backward coupling grating 20, is provided in, for example, the top surfaces of lightguides 15 and 17 in the region of dose proximity, which is the grating region 19. Grating 20 extends over a plurality of wavelengths of the desired individual signal that, in the case of demultiplexing or signal dropping, will be backward coupled from planar lightguide 15 to propagate in planar lightguide 17. The grating region 19 includes guides 15 and 17 throughout their closest separation, as well as the substrate region therebetween and the grating 20. The length L of the grating 20 is many times the wavelength being backward-coupled, and is preferably at least an order of magnitude greater than that wavelength. As will be described more fully hereinafter, the grating 20 is placed in the grating region 19 to produce phase-matching for wavelength-selective backward coupling. The grating period and the various indices of refraction determine the selected wavelength. If the grating period is chirped, a range of wavelengths will be coupled. For purposes of apodization, the grating contrast may also be made to vary.

Illustratively, a plurality of densely multiplexed signals at wavelengths $\lambda_1, \lambda_2, \lambda_3, \ldots \lambda_n$ are propagating from right to left in planar lightguide 15 from input port A toward output port B; and the backward coupled signal at individual wavelength $\lambda_i$, where i=1, 2, 3 . . . n, as desired, then propagates to the right in planar lightguide 17 from grating region 19 toward output port C. The signal at wavelength $\lambda_i$ is thus channel-dropped or demultiplexed. For purposes of illustration, let us take $\lambda_i$ to be wavelength $\lambda_2$, in which case $\lambda_2$ propagates to the right in planar lightguide 17 toward output port C. The signal at wavelength $\lambda_2$ is thus channel-dropped or demultiplexed.

The modes of the fields traveling in opposite directions in the region 19 of the grating 20 for the wavelength $\lambda_2$ begin to overlap with the close approach of the respective guides. The conditions of the fields and the properties of the grating 20 provide that a phase-matching condition $k_A+k_C=k_{grating}$ for the backward coupled signal is satisfied, where $k_A$ is the effective propagation constant of lightguide 15, $k_C$ is the effective propagation constant of the lightguide 17 and $k_{grating}$ is the effective grating propagation constant of grating 20. In particular, for lightguide 17 and grating 20 this condition is satisfied only for $\lambda_2$. Thus, $\lambda_1, \lambda_3, \ldots \lambda_n$ continue on toward output port B. Techniques to shape the response of the coupling from A to C are well known in connection with more conventional retro-reflective fiber gratings. A difference in this instance is that the $k_{grating}$ that satisfies phase-matching will be intermediate between those effective grating propagation constants that would produce retro-reflection in, respectively, lightguide 15 by itself and lightguide 17 by itself. Also, it is noted that the coupling between the guides will be weaker for the same grating modulation than for retro-reflection in an individual guide. Specifically, it will be weaker by the reduced amount of mode overlap in the present arrangement compared to the mode overlap with itself in retro-reflection in an individual guide.

Additionally, grating 20 should have the right coupling length L, so that essentially all of the selected wavelength is backward coupled and essentially none leaks through the coupling region in its original direction of propagation. With these considerations in mind, dean backward coupling between the guides involves a mutual choice of all the variables, including the amount of separation of the lightguides in the region of close proximity and length of the region of close proximity, as well as the differences in the effective indices of refraction—all of which affect the $k_{grating}$—in order to satisfy phase-matching for the backward-coupled wave.

In the grating region 19 the two lightguides should have different effective indices of refraction. Thus, it will usually be necessary to taper one or both guides from the nominal lightguide width (see at the extreme right in FIG. 1). In order that both guides be brought into close proximity from a larger separation, as at right it will be necessary to have a bend in at least one lightguide. The lightguide with the bend will preferably be the one that has the higher effective index of refraction because it will support a tighter bend without loss. The higher effective index provides better containment of the light and, consequently, less light loss at a bend. The overlap of the fields traveling in opposite directions in the two lightguides will be strongest in the region of close proximity. Thus, the grating 20 will be placed in the grating region 19 to produce phase-matching for wavelength-selective backward coupling.

The discussion of the relative effective indices and phase-matching conditions set forth in the Summary above will be further clarified by the following definitions. A plane wave propagating in the z-direction, for example propagating to the left in lightguide 15, is describable in complex notation as proportional to: $\exp\{i(kz-\omega t)\}$, where 'i' is the square root of $-1$, 'k' is the magnitude of the effective propagation vector (radians per unit length), and '$\omega$' is the angular frequency (radians per unit time).

The wave velocity is: $v=\omega/k$. In a medium other than vacuum the velocity is also: $v=c/n$, where 'c' is the velocity of light in vacuum and 'n' is the effective index of refraction in the medium. Thus, $k=nc/\omega$. Let $k_0=c/\omega$, so that $k=nk_0$.

For an optical lightguide aligned along the z-axis, a single mode of light propagating along the guide can be described as largest in the vicinity of the waveguide and diminishing in the lateral dimensions x, y away from the lightguide. The effective propagation constant turns out to be intermediate in value between $n_0 k_0$ and $n_c k_0$, where $n_0$ is the effective index of refraction of the medium surrounding the guide and $n_c$ is the effective index of refraction of material in the interior of the lightguide. The effective index of refraction will be intermediate those values, will be somewhat wavelength dependent, and will depend on the cross-sectional index profile of the lightguide. As stated hereinbefore, fatter or wider lightguides have the relatively higher effective indices of refraction.

The effective index of refraction $n_e$ of a particular waveguide mode is defined through $k_e=n_e k_0$ with the mode function: $f(x,y) \exp\{i(k_e z-\omega t)\}$. The transverse mode function is contained in $f(x,y)$ and the z dependence with respect to t is in $\exp\{i(k_e z-\omega t)\}$. While the $n_e$ depends on the transverse mode, in the preferred embodiments, the lightguides support only one spatial mode each, ignoring polarization.

Thus, the taper 27 of guide 17 and the taper 29 of guide 15 achieve different widths and, accordingly, different relative effective indices of refraction in grating region 19 while regressing toward a nominal width value far from any grating region, as shown. Specifically, taper 29 in guide 15 and taper 27 in guide 17 provide the respective like common widths at a position remote from grating region 19, here near ports A and C, respectively.

Similarly, lightguide 15 has the common width at port B, even though it illustratively has a reduced width in grating region 19. The width of guide 15 is tapered between the two regions.

The system aspects of the embodiment of FIG. 1 depend upon whether the planar lightguide circuit 11 is being used for multiplexing or demultiplexing. A demultiplexing planar lightguide circuit 11 is used with an input light source 21 appropriately coupled to input port A and supplying the multiplexed signals $\lambda_1, \lambda_2, \lambda_3, \ldots \lambda_n$. Dropped (demultiplexed) signal output 23 is appropriately coupled to output port C to further transmit signal $\lambda_2$. The residual light destination 25 can include additional signal dropping arrangements, including additional lightguides in close proximity and additional backward-coupling gratings, as will be explained further with respect to FIG. 3.

Figure 2:
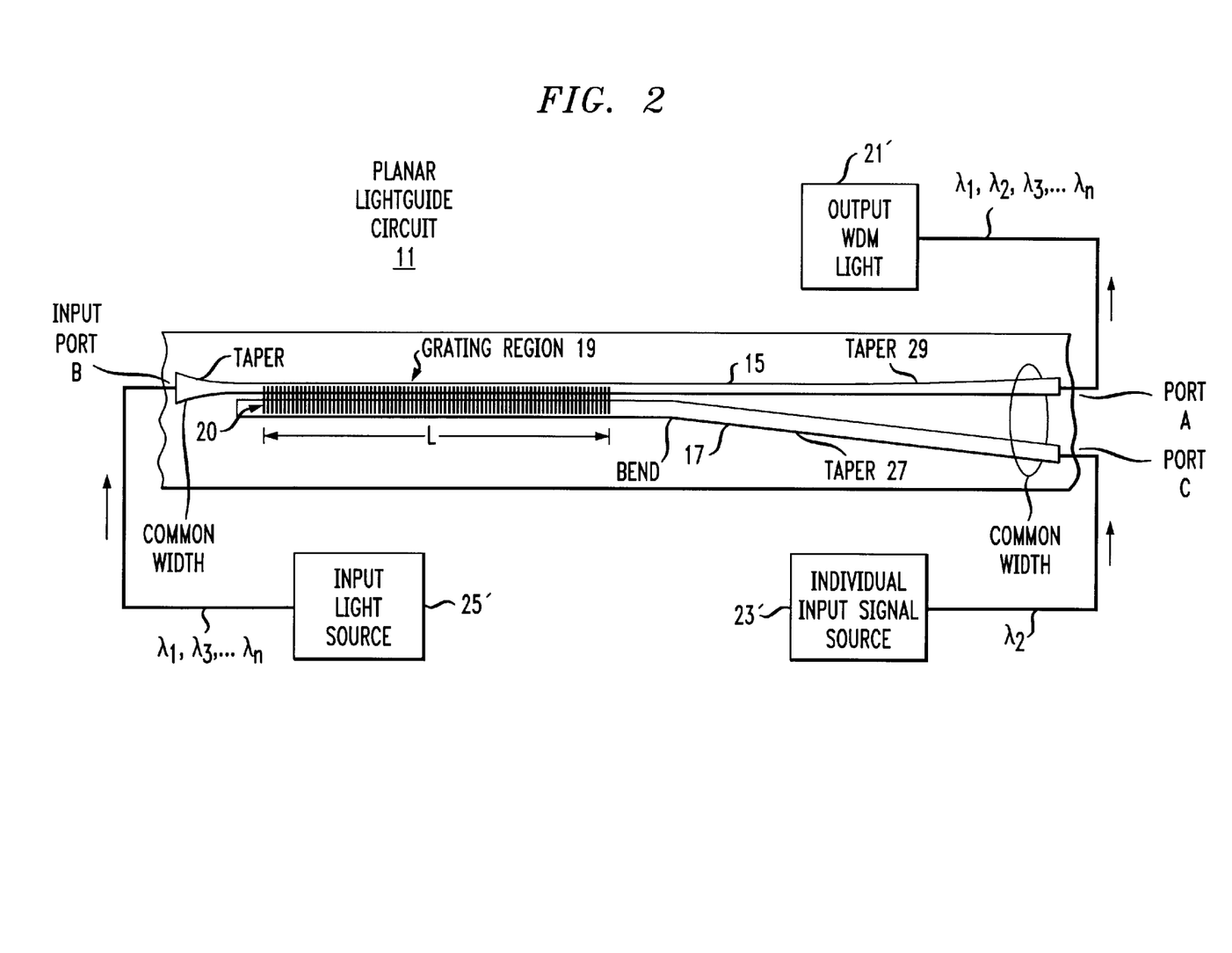
FIG. 2 shows the embodiment of FIG. 1 used as a multiplexer.

If planar lightguide circuit 11 is used as a multiplexer, as shown in FIG. 2, device 21' becomes a multiplexed signal output and device 23' becomes an individual input signal source. Residual light destination 25 at port B of the circuit 11 of FIG. 1 as a demultiplexer becomes, in FIG. 2, an input light source 25' for the partially multiplexed signal for multiplexing in the multiplexer implementation.

Figure 4:
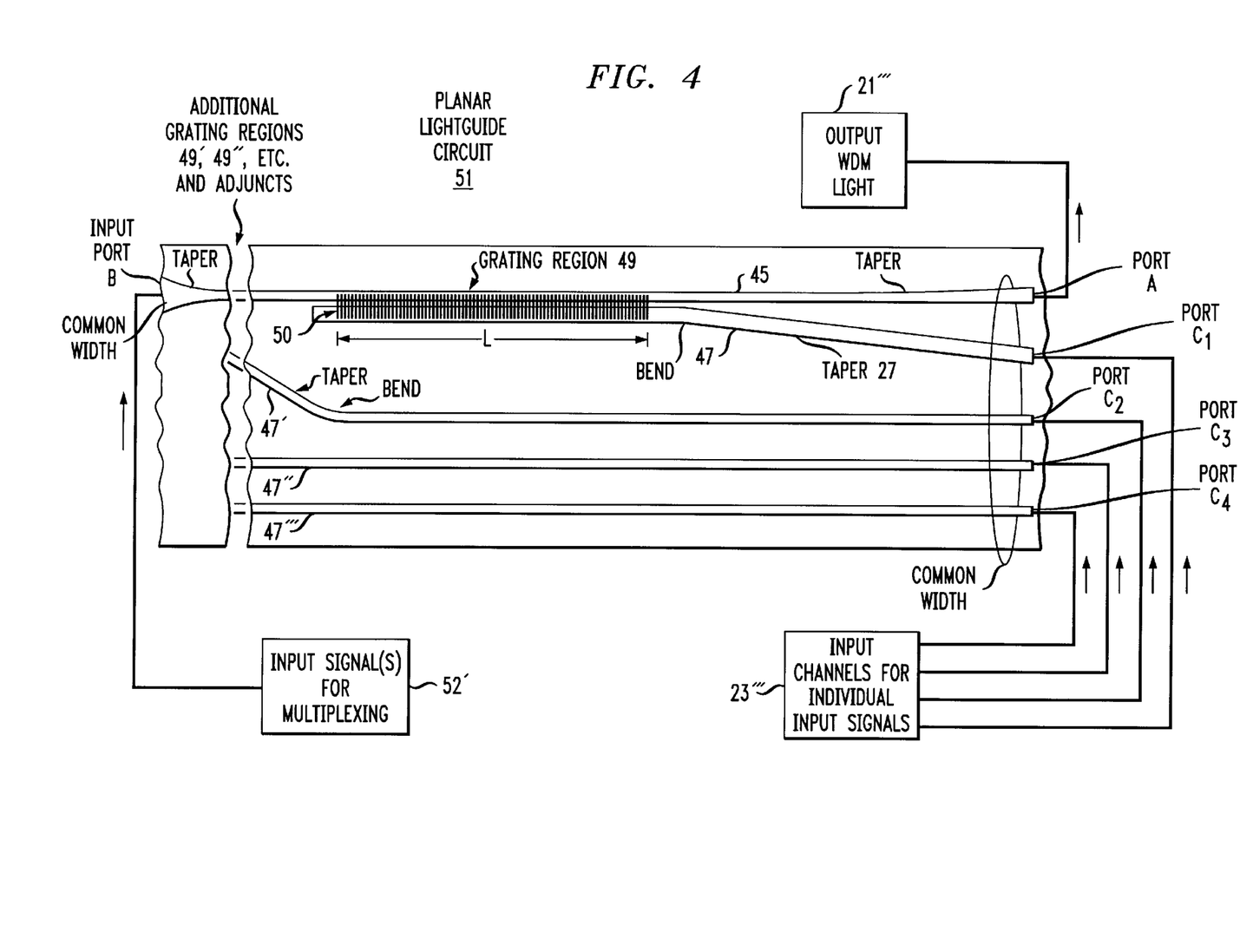
FIG. 4 shows the embodiment of FIG. 3 used as a multiplexer.

In either event, device 25' can include additional signal-multiplexing arrangements, each having lightguides and gratings like the illustrated portions of circuit 11, as explained further with respect to FIG. 4.

Figure 3:
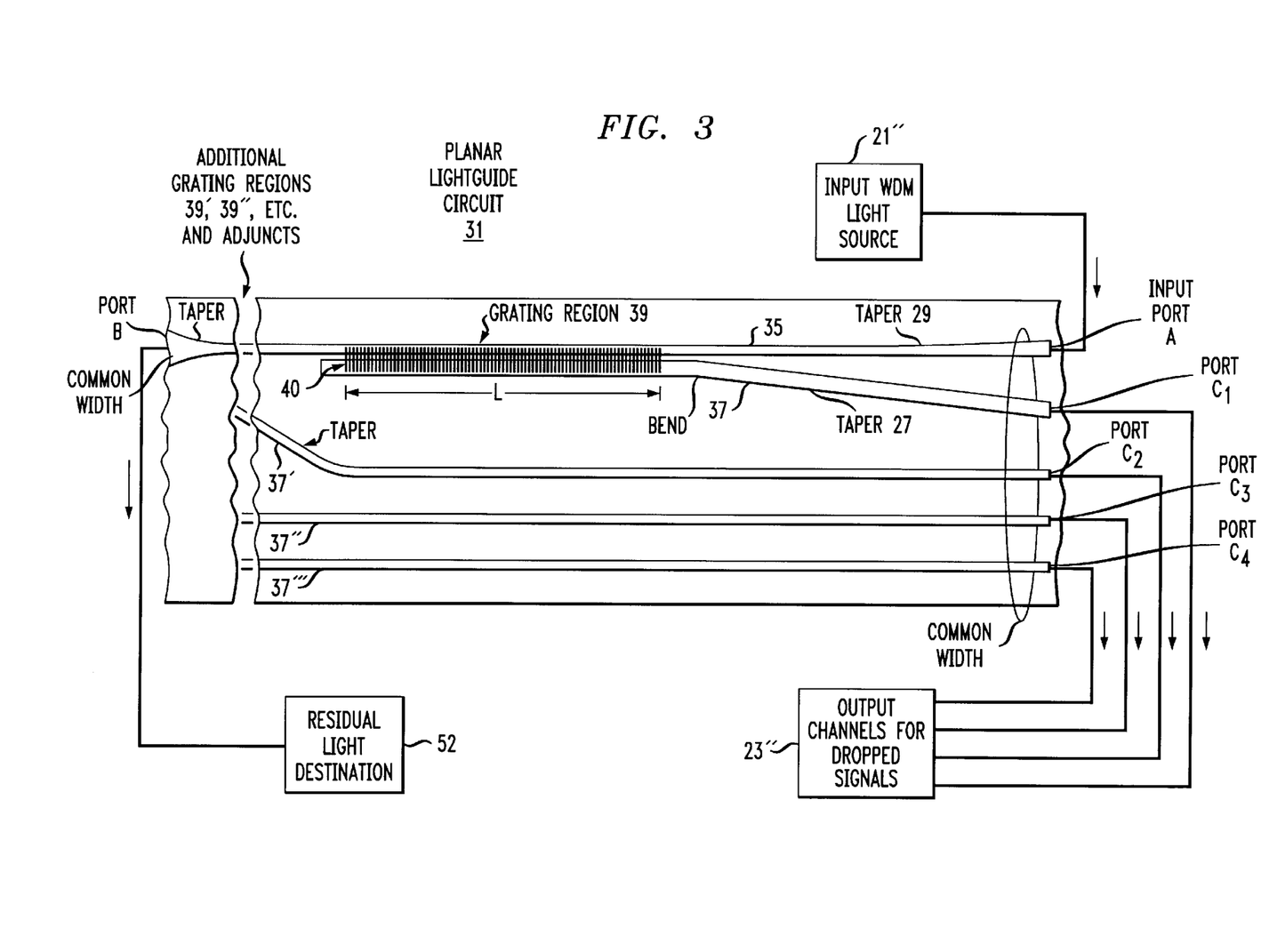
FIG. 3 shows a partially pictorial, partially block-diagrammatic view of a second, preferred embodiment of the invention used as a demultiplexer.

In FIG. 3, showing a demultiplexer implementation, the DWDM planar lightguide circuit 31 includes a plurality of the secondary higher index planar waveguides 37, 37', 37'', 37''', like lightguide 17 of FIG. 1, and a plurality of grating regions 39, 39', 39'', et cetera, with their respective gratings like grating 40 but with effective grating constants illustratively but not necessarily different from that of grating 40, each of which selects a respective individual one of the multiplexed signals for demultiplexing. Except for the specific differences in dropped wavelength, each of the added assemblies is completely analogous to the grating region 39, grating 40, and the adjacent tapered sections of guides 35 and 37. Complete demultiplexing provides that only non-useful residual light is sent, nonreflectively, to the residual light destination 52. In some appropriately designed systems, the latter destination 52 is unnecessary. Input WDM light source 21'' is similar to source 21 of FIG. 1; and output channels 23'' comprise replicas of dropped signal output 23 of FIG. 1.

The multiplexing implementation of FIG. 4 is similar to that described above for FIG. 2, except that, in a modification of the demultiplexer embodiment of FIG. 3, an input light beam is optionally provided by a source 52', replacing the residual light destination 52 of FIG. 3. Source 52' may be not needed. Input channels 23''' of differing wavelength resemble the individual input source 23' of FIG. 2. Output WDM light device 21''' is similar to output WDM light device 21' of FIG. 2.

The multiplexer arrangement of FIG. 4 provides an elaboration of the multiplexer arrangement of FIG. 2. Multiple bent guides 47, 47', 47'', and 47''' extend from input channels 23''' to respective grating regions, e.g., 49 and 49' (see FIG. 6), at each of which the main lightguide 45 is narrow to provide the appropriately different index of refraction. Except for the specific constants, each of the added assemblies of additional grating regions 49', 49'', et cetera, (FIG. 6) is completely analogous to the grating region 49, grating 50, and the nearby bends and tapered sections, et cetera, of guides 45 and 47.

Figure 5:
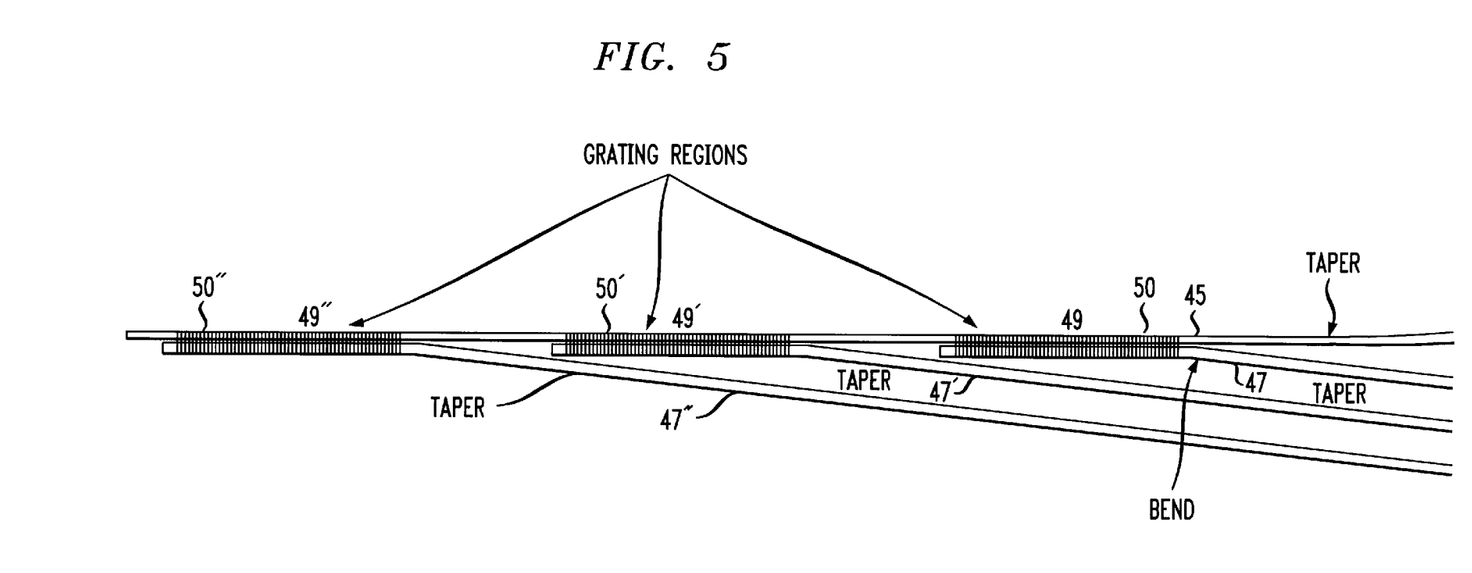
FIG. 5 shows an arrangement of a plurality of backward coupling regions and grating couplers for use in the embodiments of FIG. 3 and FIG. 4.

Brief reference is made to FIG. 5. Because of space limitations in FIG. 4 (and by analogy, also in FIG. 3, although the component numbers would differ), FIG. 5 shows a plurality of grating regions 49, 49', and 49'', a plurality of gratings 50, 50' and 50'', aid a plurality of bends in guides 47, 47' and 47'', and tapers in those guides as well as in guide 45, as all of these items would be used in FIG. 4 (and by extension, in FIG. 3).

Figure 6:
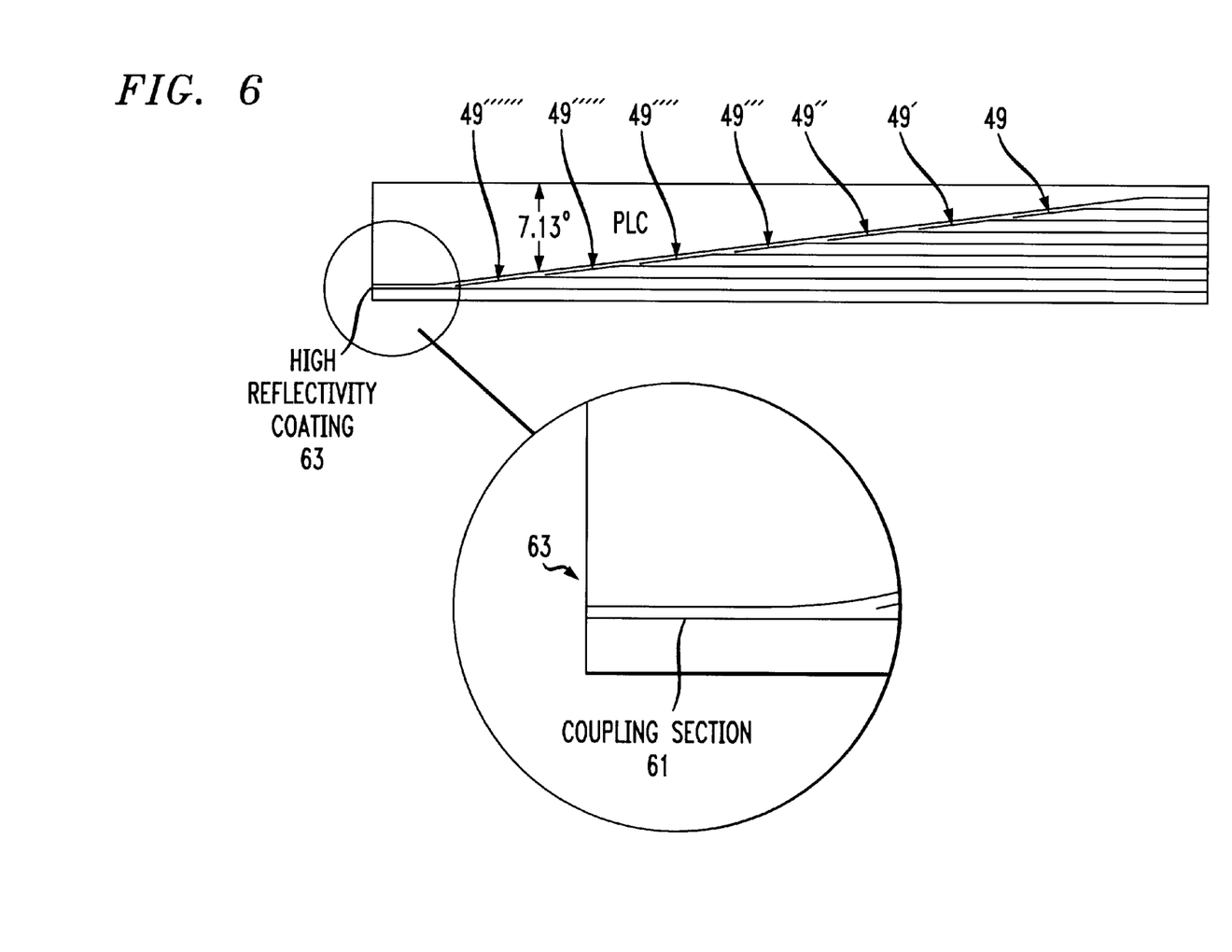
FIG. 6 shows a modification of the embodiment of FIG. 3.

FIG. 6 shows a modification of the embodiment of FIG. 3 as used near the end of a demultiplexing sequence. The grating regions 49, 49', 49'', 49''', 49'''', 49''''', and 49'''''' in which backward coupling occurs are shown schematically in order not to obscure the proximity of guides in these regions.

An optional coupling section 61 is disposed at the lower left of the planar lightguide circuit and is shown schematically in enlarged detail. Coupling section 61 has a half (½) coupling length with a high-reflectivity coating 63 on its left face. The pair of waveguides that reach the lower left corner of the planar lightguide circuit are perpendicular to the edge. The half coupling length coupling section 61, used twice because of reflection, completely couples the light path from one of the guides to the other guide. In this manner, it is possible to bring residual light of the demultiplexing sequence back to the bottom right edge of the planar lightguide circuit to be a part of the same array connection for the other ports.

The preferred embodiments present average lightguide widths where the lightguides are coupled at the edges of the planar lightguide circuit. It should be understood that, while it is preferred that only the broader guides bend in the intermediate regions, and that all guides taper to and from the average widths, these are subordinate features of the invention are not necessary conditions and that various permutations can achieve the desired differences in indices of refraction in the coupling regions. Further, the desirability of the subordinate feature providing a nominal lightguide width far from the grating regions represents a consideration of simplicity of manufacture and is also not essential to the most fundamental principle of the invention.

It should further be clear from FIGS. 2 through 4 and 6 that ports A and $C_1$ through $C_n$ can advantageously be provided at a common edge of planar lightguide circuit 31. Even if port A were not provided at this edge, there would still be substantial advantage from having all individual signal ports appear at a common edge. In either case, fabrication would be substantially eased.

The fabrication of the implementations of FIGS. 1 and 2 preferably employ a silicon substrate with appropriately doped silicon dioxide planar light guides applied thereon by known techniques. For example, in order to couple to one or more conventional communication optical fibers, one would choose to match the PLC modes to the modes of the fiber as closely as practical to maximize coupling to and from the fibers. Since the fiber cladding is silica and silicon wafers provide the basic planar technology, one would deposit planar lightguides of silica on a silicon wafer, the lightguides being approximately square or rectangular as the nominal condition, and employ doping of the silica similar to that used in the input and output fibers. Because of the practical difficulties in matching rectangular lightguides to circular input and output fibers, the respective cross-sectional areas should be approximately matched, namely, more square-like, approaching circular as much as practicable.

It should be understood that the techniques and arrangement of the present invention can be varied significantly without departing from the principles of the invention as explained above and claimed hereinafter.

What is claimed is:

1. A planar lightguide circuit comprising:
   a substrate;
   on said substrate a first planar lightguide having a first effective index of refraction and transmitting a plurality of wavelength division multiplexed signals;
   on said substrate a second planar lightguide having a second effective index of refraction different from said first effective index of refraction and in close proximity and parallel said first planar lightguide in a first region; and
   a first planar grating in coupling proximity to said first and second planar lightguides to backward couple a first signal of a selected wavelength from said first planar lightguide to said second planar lightguide;

said first and second planar lightguides extending to ports at a first edge of the planar lightguide circuit, on said substrate a third planar lightguide in close proximity and parallel in a third region to said first planar lightguide and having a third effective index of refraction different from said first effective index of refraction; and a second planar grating in coupling proximity in said third region to said third planar lightguide and said first planar lightguide to backward couple a second signal of a selected wavelength to said third planar lightguide from said first planar lightguide, wherein the first, second, and third planar lightguides are arranged to extend to ports only at said first edge.

2. The planar lightguide circuit according to claim 1, further including at a second edge opposite said first edge a high-reflectivity coating, fourth and fifth lightguides extending to said high-reflectivity coating, said fourth lightguide transmitting residual light from said first lightguide, and a coupling section coupling abutting said high-reflectivity coating and coupling light from said fourth lightguide to said fifth lightguide to propagate toward said first edge.

3. The planar lightguide circuit according to claim 2, wherein said coupling section has a length less than the length required for equivalent coupling in the absence of said high-reflectivity coating.

4. The planar lightguide circuit according to claim 2, wherein said coupling section has a length that is half the length required for equivalent coupling in the absence of said high-reflectivity coating.

5. A planar lightguide circuit comprising:

a substrate;

on said substrate a first planar lightguide having a first effective index of refraction;

on said substrate a second planar lightguide having a second effective index of refraction larger than said first effective index of refraction and in close proximity and parallel said first planar lightguide in a first region;

one of said first and second lightguides being for transmitting a plurality of wavelength division multiplexed signals; and a first planar grating in coupling proximity to said first and second planar lightguides to backward couple a first signal of a selected wavelength between the other of said first and second planar lightguides and said one of said first and second planar lightguides in said first region;

said first and second planar lightguides extending to ports at a first edge of the planar lightguide circuit;

on said substrate a third planar lightguide having a third effective index of refraction and in close proximity and parallel in a third region to said one of said first and second planar lightguides; and a second planar grating in coupling proximity in said third region to said third planar lightguide and said one of said first and second planar lightguides to backward couple a second signal of a selected wavelength between said third planar lightguide and said one of said first and second lightguides, said third planar lightguide extending to said first edge, wherein the first, second, and third planar lightguides are arranged to extend to ports only at said first edge.

6. The planar lightguide circuit according to claim 5, further including at a second edge opposite said first edge a high-reflectivity coating, fourth and fifth lightguides extending to said high-reflectivity coating, said fourth lightguide transmitting residual light from said one of said first and second lightguides, and a coupling section abutting said high-reflectivity coating and coupling light from said fourth lightguide to said fifth lightguide to propagate toward said first edge.

7. The planar lightguide circuit according to claim 6, wherein said coupling section has a length less than the length required for equivalent coupling in the absence of said high-reflectivity coating.

8. The planar lightguide circuit according to claim 6, wherein said coupling section has a length that is half the length required for equivalent coupling in the absence of said high-reflectivity coating.

9. A planar lightguide circuit, comprising:

a substrate;

first and second planar lightguides extending to ports at a first edge of said substrate and extending to a first coupling section involving mutual proximity at a second edge of said substrate opposite said first edge, said first and second planar lightguides having differing effective indices of refraction at said first coupling section;

one of said first and second lightguides being for transmitting a plurality of wavelength division multiplexed signals;

a first planar grating in coupling proximity to said first and second planar lightguides to couple a first signal of a selected wavelength between the other of said first and second planar lightguides and said one of said first and second planar lightguides in said first coupling section;

on said substrate a third planar lightguide extending to a port at said first edge of said substrate and extending to a second coupling section involving mutual proximity to said one of said first and second planar lightguides, said third planar lightguide and said one of said first and second planar lightguides having differing effective indices of refraction at said second coupling section;

a second planar grating in coupling proximity to said third planar lightguide and said one of said first and second planar lightguides to couple a second signal of a selected wavelength between said third planar lightguide and said one of said first and second lightguides in said second coupling section; and a high-reflectivity coating on said second edge at said first coupling section, said first, second, and third lightguides having no ports at said second edge.

10. The planar lightguide circuit according to claim 9, wherein said first coupling section has a length less than the length required for equivalent coupling in the absence of said high-reflectivity coating.

11. The planar lightguide circuit according to claim 9, wherein said first coupling section has a length that is half the length required for equivalent coupling in the absence of said high-reflectivity coating.

12. The planar light guide circuit according to claim 9, wherein said first planar light guide is said one for transmitting the plurality of wavelength division multiplexed signals, and said first planar grating is adapted to couple to said second planar lightguide residual signal energy from said first planar lightguide as well as said first signal of selected wavelength.

* * * * *